United States Patent [19]

Akiyama

[11] Patent Number: 4,557,148

[45] Date of Patent: Dec. 10, 1985

[54] ULTRASONIC FLOWMETER

[75] Inventor: Chuji Akiyama, Tokyo, Japan

[73] Assignee: Yokogawa Hokushin Electric Corporation, Tokyo, Japan

[21] Appl. No.: 601,051

[22] Filed: Apr. 16, 1984

[30] Foreign Application Priority Data

Apr. 21, 1983 [JP] Japan ................................. 58-70600

[51] Int. Cl.$^4$ ............................................. G01F 1/66
[52] U.S. Cl. ................................. 73/861.28; 364/510
[58] Field of Search ........... 73/861.27, 861.28, 861.29; 364/510

[56] References Cited

U.S. PATENT DOCUMENTS

| 3,780,577 | 12/1973 | Brown ............................... | 73/861.28 |
| 3,818,757 | 6/1974 | Brown ............................... | 73/861.28 |
| 4,183,244 | 1/1980 | Kohno et al. ..................... | 73/861.28 |
| 4,271,708 | 6/1981 | Kohno et al. ..................... | 73/861.28 |

*Primary Examiner*—Charles A. Ruehl
*Attorney, Agent, or Firm*—Moonray Kojima

[57] ABSTRACT

An ultrasonic flowmeter comprising a signal generator for supplying a synchronizing signal to an ultrasonic propagation path and a frequency division time signal to a flow rate computing unit; the flow rate computing unit comprising a time difference detector for determining time difference between a reception time signal from the ultrasonic propagation path and the frequency division time signal from the signal generator, and for generating a signal indicative of which signal is earlier than the other; a sequential approximating means responsive to an output signal form the time difference detector for effecting sequential approximating computation; and a flow rate computing circuit responsive to the output from the sequential approximating means for computing the flow rate of the fluid. The ultrasonic flowmeter is simple, accurate and reliable, and is inexpensive to manufacture.

4 Claims, 11 Drawing Figures

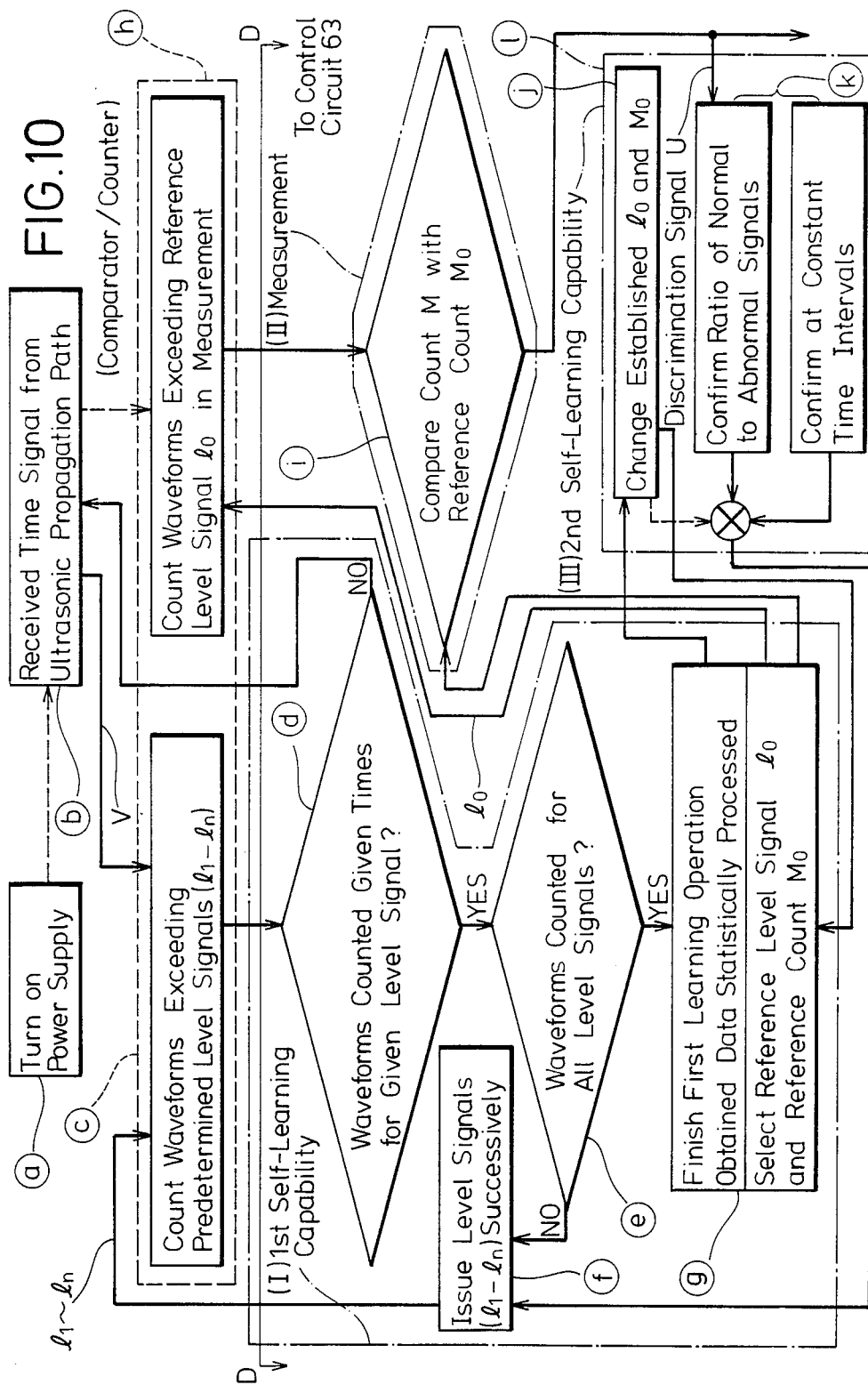

ULTRASONIC FLOWMETER

BACKGROUND OF THE INVENTION

1. Field of Invention

This invention relates to an ultrasonic flowmeter, and more particularly, to such a flowmeter which is of simple arrangement and which can measure a flow rate with high degree of accuracy.

2. Description of Prior Art

Ultrasonic flowmeters generally have a pair of ultrasonic transducers attached to opposite walls of a pipe through which a fluid to be measured flows. The ultrasonic transducers are usually staggered in the direction of flow of the fluid. The time $T_1$ in which an ultrasonic wave as transmitted by the transducers in a direction with which the flow propagates, and the time $T_2$ in which an ultrasonic wave as transmitted by the transducers in a direction against the flow propagates, are different from each other since the speeds of ultrasonic waves in the flowing fluid are subjected to apparent variations due to the speed of flow of the fluid.

These times are expressed as follows:

$$T_1 = l/(C + F_V \sin\theta); \quad T_2 = l/(C - F_V \sin\theta) \tag{1}$$

wherein C is the velocity of sound propagation in the fluid; $F_V$ is the speed of flow of the fluid; D is the inside diameter of the pipe; $\theta$ is the angle at which the ultrasonic wave is radiated into the pipe; and l is the distance between the ultrasonic transducers and given by $l = D/\cos\theta$. The difference between the reciprocals of the ultrasonic propagation times $T_1$, $T_2$ is given by:

$$\frac{1}{T_1} - \frac{1}{T_2} = \frac{C + F_V \sin\theta}{l} - \frac{C - F_V \sin\theta}{l} = \frac{2 F_V \sin\theta}{l} = \frac{F_V \sin 2\theta}{D} \tag{2}$$

In equation (2), sound velocity C in the medium to be measured is eliminated. Since inside diameter D of the pipe and incident angle $\theta$ are constant, speed V of flow of the fluid can be determined without being affected by sound velocity C by finding the difference between the reciprocals of the ultrasonic propagation times $T_1$, $T_2$.

With the speed $F_V$ of flow of the fluid being determined, the flow rate $Q_F$ can be determined by the following:

$$Q_F = \frac{\pi}{4} D^2 \cdot F_V = \frac{\pi}{4} D^2 \left(\frac{D}{\sin 2\theta}\right) \left(\frac{1}{T_1} - \frac{1}{T_2}\right) \tag{3}$$

Accordingly, the ultrasonic flowmeter should be designed to determine ultrasonic propagation times $T_1$, $T_2$.

Ultrasonic flowmeters are roughly divided into two categories: (1) sing-around type; and (2) phase-locked loop type. The ultrasonic flowmeter of the sing-around type has a pair of ultrasonic transducers attached in obliquely confronting relation to a pipe through which a fluid to be measured flows. Ultrasonic waves are oscillated alternately from one of the ultrasonic transducers to the other and vice versa. The flow rate of the fluid can be derived from the difference between periods which are the reciprocals of ultrasonic transit times, that is the difference between the oscillation frequencies.

The sing-around type flowmeter is disadvantageous in that when bubbles or dirt, which blocks off ultrasonic wave transmission, passes between the ultrasonic transducer, singaround oscillation is stopped and no measurement is possible. The frequency f of sing-around frequency can be expressed by:

$$f = \frac{C \pm F_V \sin\theta}{D/\cos\theta} \tag{4}$$

Assuming in the equation (4) that $C = 1450$ m/sec.; $F_V = 1$ cm/sec.; $D = 50$ mm; and $\theta = 22°$, the difference between sing-around oscillation frequencies, that is, the difference $\Delta f$ between a sing-around oscillation frequency $f_1$ at the time an ultrasonic wave is propagated through the fluid in a direction going with the flow of the fluid and a singaround frequency $f_2$ at the time an ultrasonic wave is propagated through the fluid in a direction going against the flow of the fluid, becomes 0.14 Hz. If the resolution of flow speed measurement is 1 cm/sec, then the measurement time needed is $2/\Delta f \approx 14$ sec., or longer, as there are required a measurement time for ultrasonic propagation in a direction going with the fluid flow and a measurement time for ultrasonic propagation in a direction going against fluid flow. Thus, the sing-around type ultrasonic flowmeter is poor in response.

The flowmeter of the phase-locked loop type is described, for example, in FIG. 1. Components used in measurements based on ultrasonic propagation in directions going with and going against the fluid flow are denoted by reference numerals having suffixes a and b, respectively, and are connected in paired circuits.

Ultrasonic waves are simultaneously radiated with signals from oscillators 2a, 2b into a fluid F to be measured, through ultrasonic transducer 1a,1b attached to outer peripheral surfaces of a pipe T through which fluid F flows. The radiated ultrasonic waves are received by the opposite ultrasonic transducers 1b,1a and then led, as received pulses (amplitude-dependent) to amplifiers 3a, 3b, which are arranged to vary their gains by control signals. The received amplitude-dependent pulses fed to amplifiers 3a,3b are then applied to comparators 4a,4b wherein the amplitudes are compared to preset threshold values. The results of the comparisons are fed, as control signals, back to amplifiers 3a,3b. Thus, amplifiers 3a,3b generates output pulses of constant amplitudes to waveform detectors 5a,5b, respectively, irrespective of the magnitudes of the amplitudes of the received pulses.

Simultaneously with the ultrasonic radiation, outputs from voltage-controlled oscillators 7a,7b are counted respectively by counters 8a,8b, which generate pulses when the counts reach manually set preset count values. Time difference voltage converters 6a,6b are supplied with output pulses from waveform detectors 5a,5b and output pulses from the counters 8a,8b for producing voltage outputs that control the oscillation frequencies of voltage controlled oscillators 7a,7b so that the time differences between the output pulses supplied by the counters 8a,8b to time difference votage converters 6a,6b and the output pulses from waveform detectors 5a,5b are eliminated.

The oscillated outputs from voltage controlled oscillators 7a,7b are led to a differential frequency detector 9 which generates a signal having a frequency equal to the difference between the oscillation frequncies of the voltage controlled osciallators 7a,7b to a frequency-to-voltage converter 10. The signal applied to frequency-to-voltage converter 10 is converted into a voltage proportional to the frequency, which is then applied to a sample-and-hold circuit 11.

A comparator 12 compares the outputs (control signals) from comparators 4a,4b with a preset value of a voltage immediately before it is of a value sufficient for the overall apparatus to operate normally or a lower value, and supplies sample-and-hold circuit 11 with a discrimination signal for determining whether the output from frequency-to-voltage converter 10 is normal or not. When ultrasonic reception is normal, the sample-and-hold circuit 11 delivers the output of frequency-to-voltage converter 10, as it is. When the ultrasonic transfer coefficient of the fluid being measured is lowered, the sample-and-hold circuit 11 continues to supply the normal output immediately prior to the reduction of the ultrasonic transfer coefficient.

With the phase-locked loop system, the difference between the oscillation frequencies of two voltage controlled oscillators 7a,7b becomes smaller as the speed of flow of the fluid being measured, is lowered. Where there are a plurality of oscillators having close oscillation frequencies within one apparatus, the power supply circuits or the oscillation frequencies oscillating through electromagnetic coupling are subjected to mutual interference, resulting in a frequency pull-in phenomenon. The flowmeter has a dead zone due to the frequency pull-in phenomenon in the range wherein the speed of flow of the fluid is low. Stated otherwise, the accuracy of flow rate measurement is poor in the range of low flow speeds.

Solving the above problem requires that the interference between the oscillators be removed. However, designing or packaging a circuit to remove the mutual interference would be difficult to achieve in view of the size and cost of the apparatus that would be involved.

The dead zone is likely to vary since the degree of mutual interference tends to vary due to deterioration of the components. Thus, it would be difficult to keep the measurement accuracy constant for a long period of time.

Another problem with the prior art is that the number of parts required is large and cost is increased, and reliability is lowered. Since the circuit arrangement is composed of many analog circuits, it is susceptible to drift. In addition, the flowmeter suffers from errors during transient conditions, such as immediately after power is turned on or when the flow rate is abruptly changed, because the circuit has a slow response time, and especially because the two circuits have two different response times.

SUMMARY OF THE INVENTION.

Accordingly, an object of the invention is to improve the prior art, and overcome the aforementioned and other deficiencies and disadvantages of the prior art.

Another object is to eliminate the problems due to mutual interference and to provide capability for measuring ultrasonic propagation times with high accuracy irrespective of the speed of flow of a fluid being measured.

A further object is to provide a highly reliable ultrasonic flowmeter which is of a simple circuit arrangement, which can be manufactured at low cost, and which has a measuring accuracy that will be maintained for an extended period of time.

A still further object is to provide an ultrasonic flowmeter which is of digital circuit arrangement, which is free from drift, and which has a short response time.

The foregoing and other objects are attained by the invention, which encompasses an ultrasonic flowmeter comprising a pipe for passage therethrough of a fluid to be measured; an ultrasonic propagation path comprising ultrasonic transducers mounted on the pipe for transmitting and receiving an ultrasonic wave through the fluid flowing through the pipe; a signal generator for generating a synchronizing signal to drive the ultrasonic transducers; a flow rate computing unit for computing a flow rate of the fluid in response to a reception signal from the ultrasonic propagation path, the signal generator comprising a converter circuit responsive to a control signal from the flow rate computing unit for supplying the synchronizing signal and a frequency division time signal synchronous with the synchronizing signal, and the flow rate computing unit comprising a time difference detector supplied with the frequency division time signal from the signal generator and the reception time signal from the ultrasonic propagation path for detecting a time difference between the supplied signals; and a sequential approximating means responsive to an output signal from the time difference detector for supplying the control signal to cause the frequency division time signal to approach the reception time signal in sequential approximation.

BRIEF DESCRIPTION OF DRAWINGS.

FIG. 10 is a flow chart depicting operational routines of the embodiment of FIG. 7.

DETAILED DESCRIPTION OF PREFERRED EMBODIMENTS.

Figure 1:
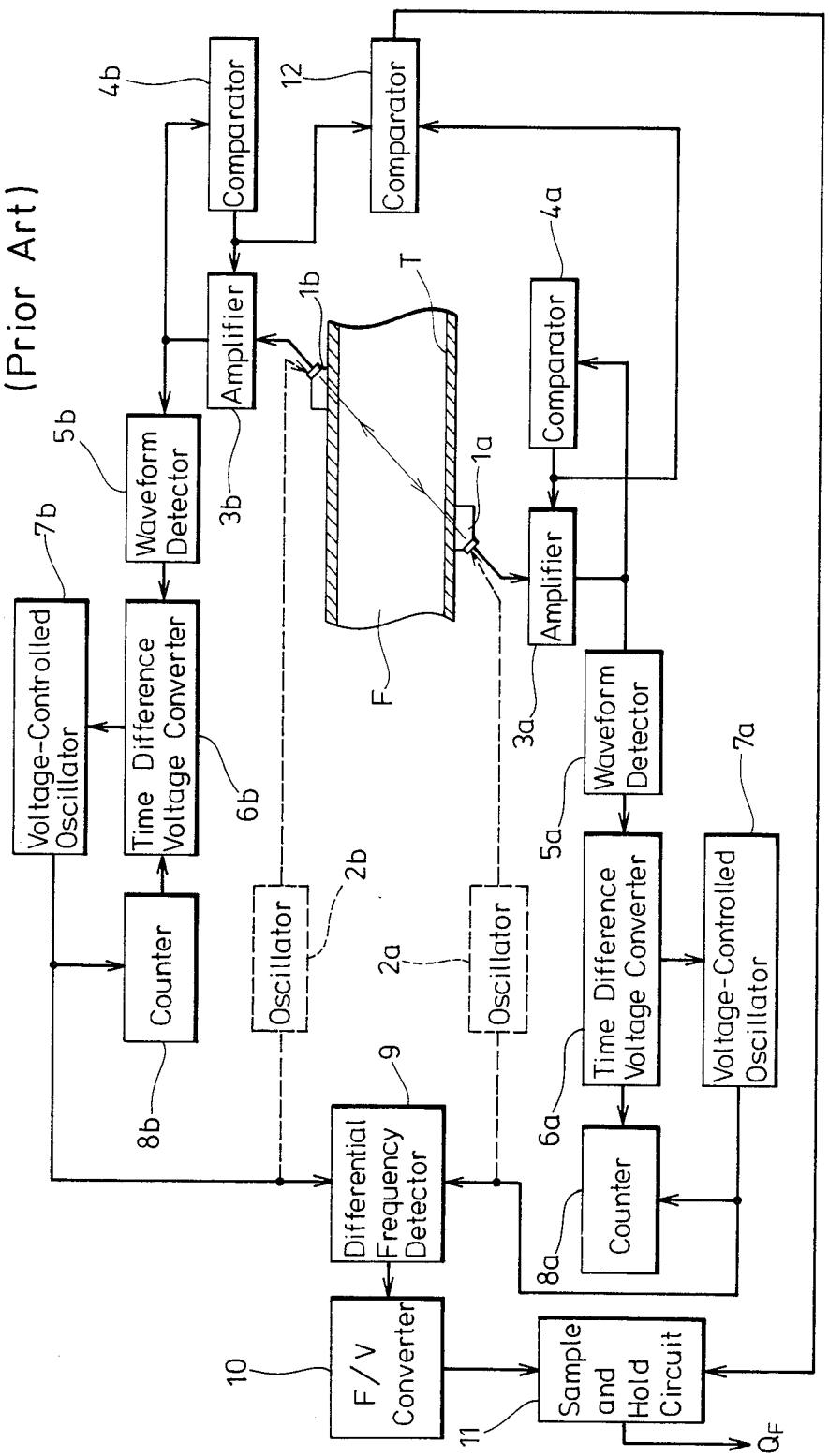
FIG. 1 is a block diagram depicting a conventional ultrasonic flowmeter of the phase-locked loop type.
Figure 2:
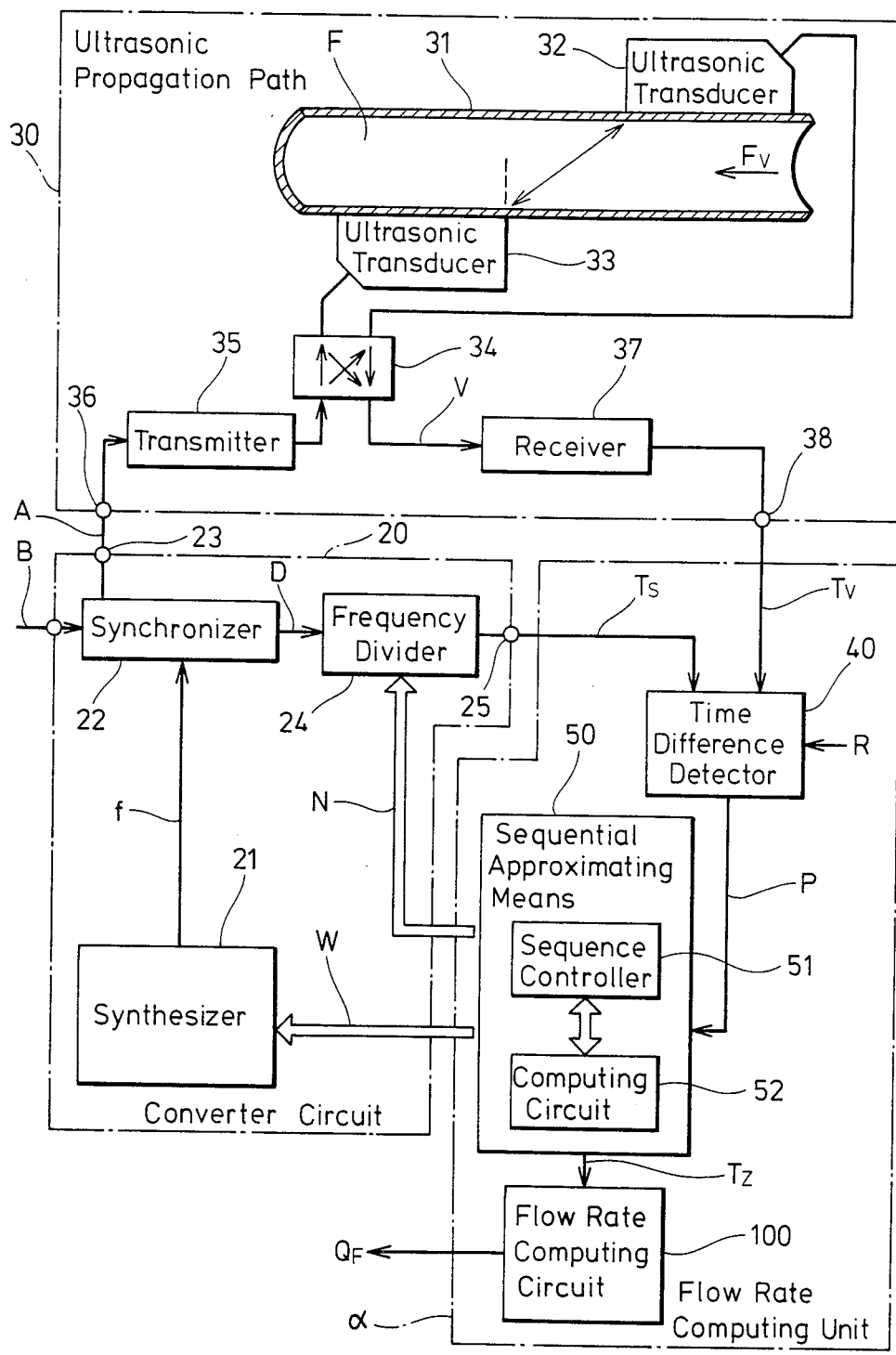
FIG. 2 is a block diagram depicting an illustrative embodiment of the invention.

FIG. 2 shows the inventive ultrasonic flowmeter comprising a converter circuit, serving as a signal generator; an ultrasonic propagation path 30; and a flow rate computing unit $\alpha$ comprising a time difference detector 40, a sequential approximating means 50, and a flow rate computing circuit 100.

Converting circuit 20 is supplied with control signals N,W (of digital values comprising 1's and 0's) from sequential approximating means 50 in flow rate computing unit $\alpha$, and a start signal B comprising clock pulses having a period longer than an oscillation period, for example, and generates a synchronizing signal A which is supplied to ultrasonic propagation path 30 and a frequency dividing time signal $T_S$ (described in detail hereinafter) to time difference detector 40. Converter circuit 20 comprises a synthesizer 21 supplied with control signal W of a digital value of 1's and 0's for supplying a signal having a frequency characteristic f (=a+bw, where a and b are constants); a synchronizer 22 supplied with output frequency f from synthesizer 21 and start signal B for synchronizing output frequency f and start signal B and generating synchronizing signal A which is supplied to ultrasonic propagation path 30; and a frequency divider 24 supplied with a pulse signal D (from synchronizer 22) synchronous with synchronizing signal A and control signal N (from sequential approximating means 50) for frequency dividing pulse signal D according to control signal N and generating frequency dividing time signal $T_S$ at the time the frequency division is completed.

Ultrasonic propagation path 30 comprises a pipe 31 through which a fluid F to be measured flows at a speed $F_V$; ultrasonic transducers 32,33 mounted on pipe 31 for transmitting and receiving ultrasonic waves through fluid F; a switching element 34 for switching ultrasonic transducers 32,33 between transmitting and receiving modes; a transmitter 35 which is supplied with synchronizing signal A from converter circuit 20 through an input terminal 36 for supplying synchronizing signal A, as amplified, to transducer 32, or 33 through switching element 34; and a receiver 37 which is supplied with a pulsed signal V received by transducer 32 or 33 through element 34 and which is used for amplifying received signal V, comparing received signal V with a preset threshold value and supplying a resultant reception time signal $T_V$ to time difference detector 40 through an output terminal 38. Ultrasonic propagation path 30 is in no way limited to the illustrated arrangement. For example, the switching element may be dispensed with by providing dedicated ultrasonic transmitters and receivers in combination therewith.

Flow rate computing unit α comprises, as described above, time difference detector 40 for determining time difference between reception time signal $T_V$ from path 30 and frequency division time signal $T_S$ from converter circuit 20 for supplying an output signal P indicative of which signal is earlier than the other; sequential approximating means 50 which is supplied with output signal P, and which is used for effecting a sequential approximating computation; and flow rate computing circuit 100 which is response to an output signal $T_Z$ from sequential approximating means 50 for computing a flow rate of fluid F flowing through pipe 31.

Figure 3:
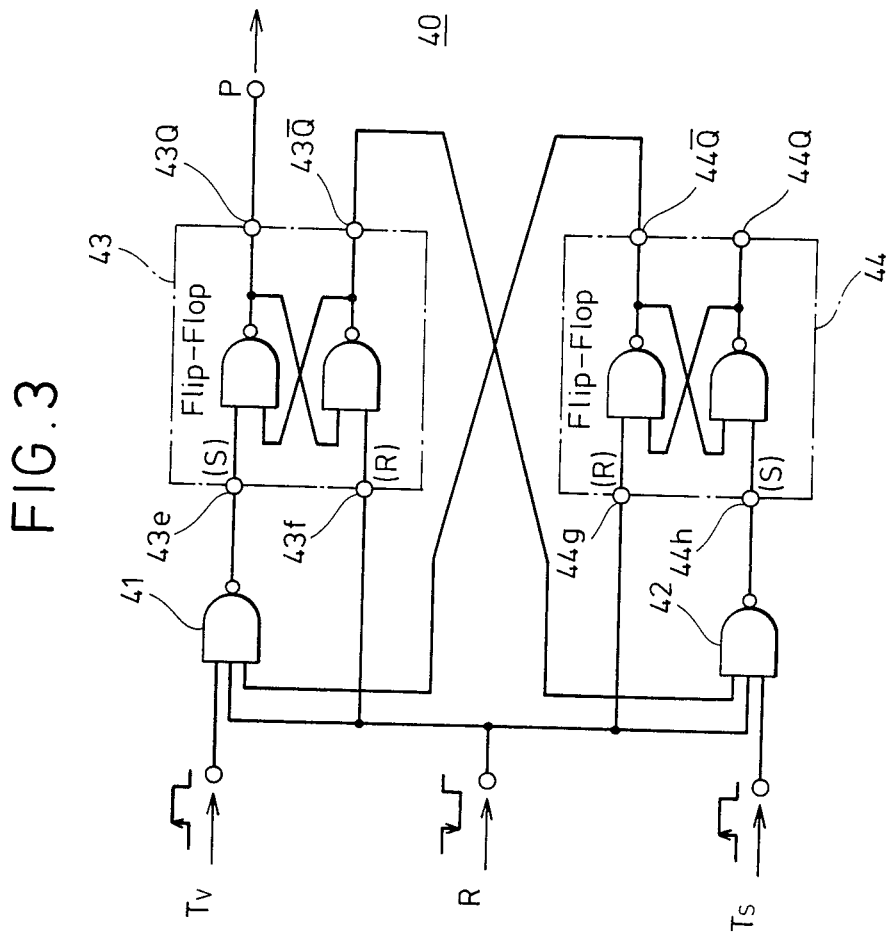
FIG. 3 is a circuit diagram depicting a time difference detector used in the embodiment of FIG. 2.

FIG. 3 illustrates a specific circuit for time difference detector 40 of FIG. 2. The circuit 40 includes NAND gates 41, 42 and flip-flop circuits (hereinafter called "FF") 43,44. NAND gate 41 is supplied with reception time signal $T_V$, a reset signal R, and an inverted output from an output terminal $\overline{Q}$ of FF 44. NAND gate 42 is supplied with frequency division time signal $T_S$, reset signal R, and an inverted output from an output terminal $\overline{Q}$ of FF43. NAND gate 41 supplies an output signal to a set S termainal 43e of FF43. NAND gate 42 supplies an output signal to a set S terminal 44h of FF 44. Reset signal R is delivered to, other than NAND gates 41,42, reset R terminals 43f,44g of FF 43,44, respectively. FF 43 has an output terminal Q for supplying an output signal P. With time difference detector 40 thus constructed, it can be initialized by reset signal R and output signal P can be determined by the order in which the reception time signal $T_V$ and frequency division time signal $T_S$ rise. More specifically, time difference detector 40 compares ultrasonic propagation time T with the interval of a time N/f produced in synthesizer 21 and frequency divider 24 in converter circuit 20.

Returning again to FIG. 2, sequential approximating means 50 comprises a sequence controller 51 and a computing circuit 52 for receiving output signal P from time difference detector 40 and supplying control signals N,W and computed output $T_Z$ (through a computing process which will be described hereinafter). Flow rate computing circuit 100 computes flow rate $Q_F$ based on computed output $T_Z$ from sequential approximating means 50 according to above equation (3).

Figure 4:
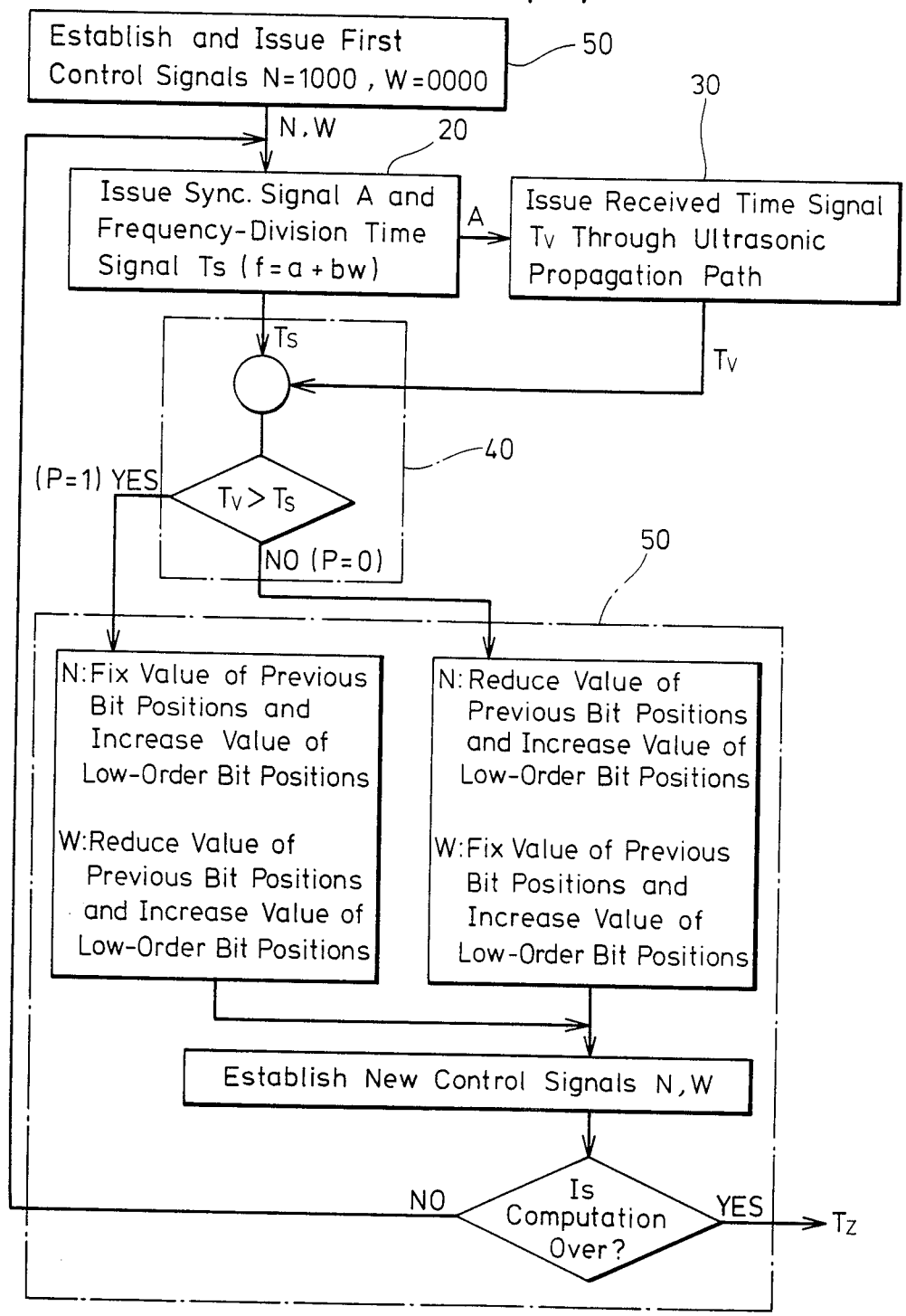
FIG. 4(A) is a flow chart depicting operational routines of the embodiment of FIG. 2.
FIG. 4(B) is a timing diagram depicting operation of a sequential approximating means.
Figure 4:
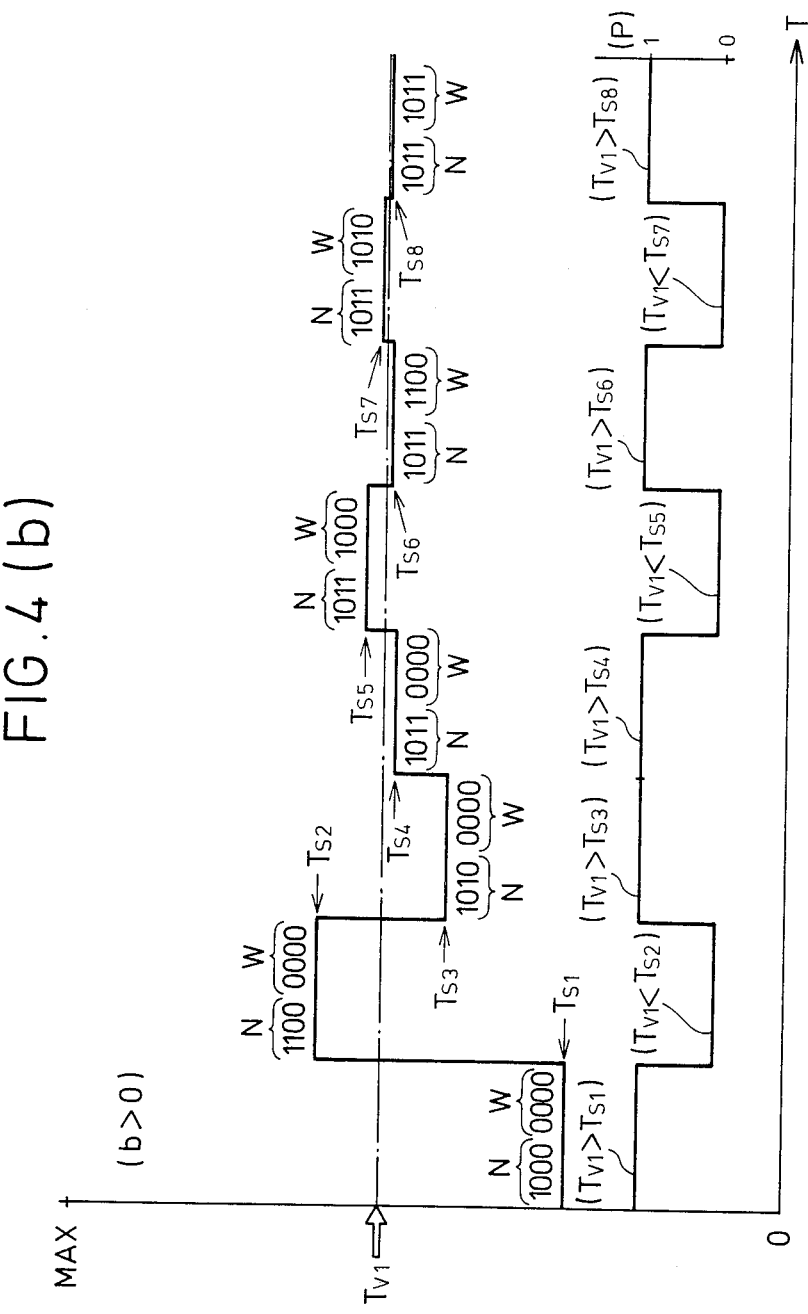

Operation of the ultrasonic flow meter of FIG. 2 will now be described with reference to the flow chart of FIG. 4(A) and the timing chart or diagram of FIG. 4(B). It is assumed in FIG. 2, that switching element 34 is initially set, such that ultrasonic waves are radiated from ultrasonic transducer 32 to ultrasonic transducer 33 in a direction going with the flow of fluid F. The reception time signal is denoted by $T_{V1}$ and is of a constant value for ease of illustration. Ultrasonic propagation time T (described later) supplied as computed output $T_Z$ from sequential approximating means 50 can be computed by the following:

$$T = N/f = N/(a+bW) \qquad (5)$$

In the flow chart of FIG. 4(A) and the timing diagram of FIG. 4(B), the following routines are carried out.

1. Control signal N has a larger value than that of control signal W in sequential approximating means 50. For example, the initial value of control signal N is 1000 and that of control signal W is 0000. They are applied to converter circuit 20.

2. In converter circuit 20, synthesizer 21, which is supplied with control signal W (0000), supplies, to synchronizer 22, a signal having a frequency characteristic $f_1 = a$ (since W=0). Synchronizer 22, responsive to start signal B and frequency characteristic signal $f_1$, supplies a synchronizing signal $A_1$ (suffixes "1,2, . . . n" indicate the number of measurement occurrences) to ultrasonic propagation path 30 and also supplies pulse signal D to frequency divider 24. Frequency divider 24, responsive to pulse signal D and control signal N (1000), supplies a frequency division time signal $T_{S1}$ ($N_1/f_1$) to time difference detector 40.

3. Synchronizing signal A is supplied as the reception time signal $T_{V1}$ through ultrasonic propagation path 30 to time difference detector 40.

4. Time difference detector 40 compares reception time signal $T_{V1}$ with frequency division time signal $T_{S1}$. In the timing diagram of FIG. 4(B), assume that output signal P of time difference detector 40 has a value of 1 at the time $T_V \geq T_S$ and has a value of 0 at the time $T_V \leq T_S$. Thus, when control signal N is 1000 and control signal W is 0000, $T_V \geq T_{S1}$ as a result of comparison in time difference detector 40. Hence P=1. Output signal P is then delivered to sequential approximating means 50 to drive sequence controller 51 to thereby increase the value of control signal N from 1000 to 1100. Sequential approximating means 50 applies new control signal N to converter circuit 20. Sequential approximating means 50 changes the values of control signals N , W dependent on the sign (positive or negative) of "b" of output frequency f=a+bW from synthesizer 21 in converter circuit 20.

When $T_V \geq T_S (P=1)$ (A) ($b \geq 0$) In the value of control signal N, the value of previously set bit positions, is fixed and the value of low order bit positions is increased. In the value of control signal W (only after the value of set bit positions are all fixed, this being true in subsequent conditions), the value of previous set bit positions is reduced, and the value of low order bit positions is increased.

(B) ($b \leq 0$) In each of the values of control signals N,W the value of previously set bit positions is fixed, and the value of low order bit positions is increased.

When $T_V \leq T_S (P=0)$ (A) ($b \geq 0$) In the value of control signal N, the value of previously set bit positions is reduced and the value of low order bit positions is increased. In the value of control signal W, the value of previous set bit positions is fixed, and the value of low order bit positions is increased.

(B) ($b \leq 0$) In each of the values of control signals N,W the value of previously set bit positions is reduced, and the value of previously set bit positions is reduced, and the value of low order bit positions is increased.

FIG. 4(A) illustrates the situation wherein $b \geq 0$.

5. The converter circuit 20 supplied with control signal N, of 1100, and control signal W of 0000, generates a frequency division time signal $T_{S2}$ and a synchronizing signal A which are based on these values of the control signals. In the timing diagram of FIG. 4(B), time difference detector 40 generates an output signal P=0 since $T_{V1} \leq T_{V2}$. Thus, sequential approximating means 50 drives sequence controller 51 to change the value of control signal N from 1100, to 1000, to 1010, and supplies the value to converter circuit 20.

6. A frequency division time signal $T_{S3}$ based on control singals N of 1010, and W of 0000, is supplied from converter circuit 20 to time difference detector 40, wherein $T_{S3}$ and $T_{V1}$ are compared. Since $T_{V1} \geq T_{S3}$ output signal P=1, and the value of control signal N is increased from 1010 to 1011.

7. Frequency division time signal $T_{S4}$ based on control signals N of 1011 and W of 0000, is supplied from converter circuit 20 to time difference detector 40, wherein $T_{S4}$ and $T_{V1}$ are compared. Since $T_{V1} \geq T_{S4}$, output signal P=1, and the value of control signal N is fixed as 1011, and the value of low order bit positions, that is, control signal W is increased from 0000 to 1000.

8. A frequency division time signal $T_{S5}$, based on control signal W of 1000 (the control signal N will be omitted from the following description since it will be fixed at 1011) is supplied from converter circuit 20. Since $T_{V1} \leq T_{S5}$ in time difference detector 40, output signal P=0, and the value of control signal W is increased from 1000 to 1100.

9. The process continues likewise, and it will be understood that a frequency division time signal $T_{S8}$ finally approximating the reception time signal $T_{V1}$ is generated when control signals N, W have values 1011, 1011. Accordingly, computing circuit 52 in sequential approximating means 50, computes an ultrasonic propagation time $T_1$ as the ultrasonic wave goes in the same direction as the fluid flow, based on control signals N,W according to equation (5), and the results of the two computations are supplied as computed output $T_Z$ to flow rate computing circuit 100.

10. Then, switching element 34 in ultrasonic propagation path 30 is changed over to cause an ultrasonic wave to be radiated from ultrasonic transducer 33 to transducer 32 in a direction going against the flow of fluid F in pipe 31. An ultrasonic propagation time $T_2$ will be determined in the same manner as that wherein ultrasonic propagation time $T_1$ has been determined as described above. The determined value is supplied to flow rate computing circuit 100.

Ultrasonic propagation times $T_1$, $T_2$ are determined according to the foregoing steps (1) through (10). Based on the determined ultrasonic propagation times $T_1$, $T_2$, flow rate computing circuit 100 computes flow rate $Q_F$ of fluid F according to equation (3).

The embodiment has many advantages. For example, the time required for measurements can be reduced by effecting alternately, cycles for determining the propagation times $T_1$, $T_2$. Since approximate values of control signals N, W have been known in prior cycles, the number of following cycles can be reduced. Although computed output $T_Z$ from sequential approximating means 50 has been described as representing propagation times $T_1$, $T_2$ control signals N,W may be generated as they are, to enable flow rate computing circuit 100, to determine ultrasonic propagation times $T_1$, $T_2$, or sequential approximating means 50 may incorporate therein the function of flow rate computing circuit 100. Furthermore, sequential approximating means 50 and flow rate computing circuit 100 may comprise a single microcomputer or respective separate microcomputers. The converter circuit 20 may also comprise a microcomputer.

Figure 5:
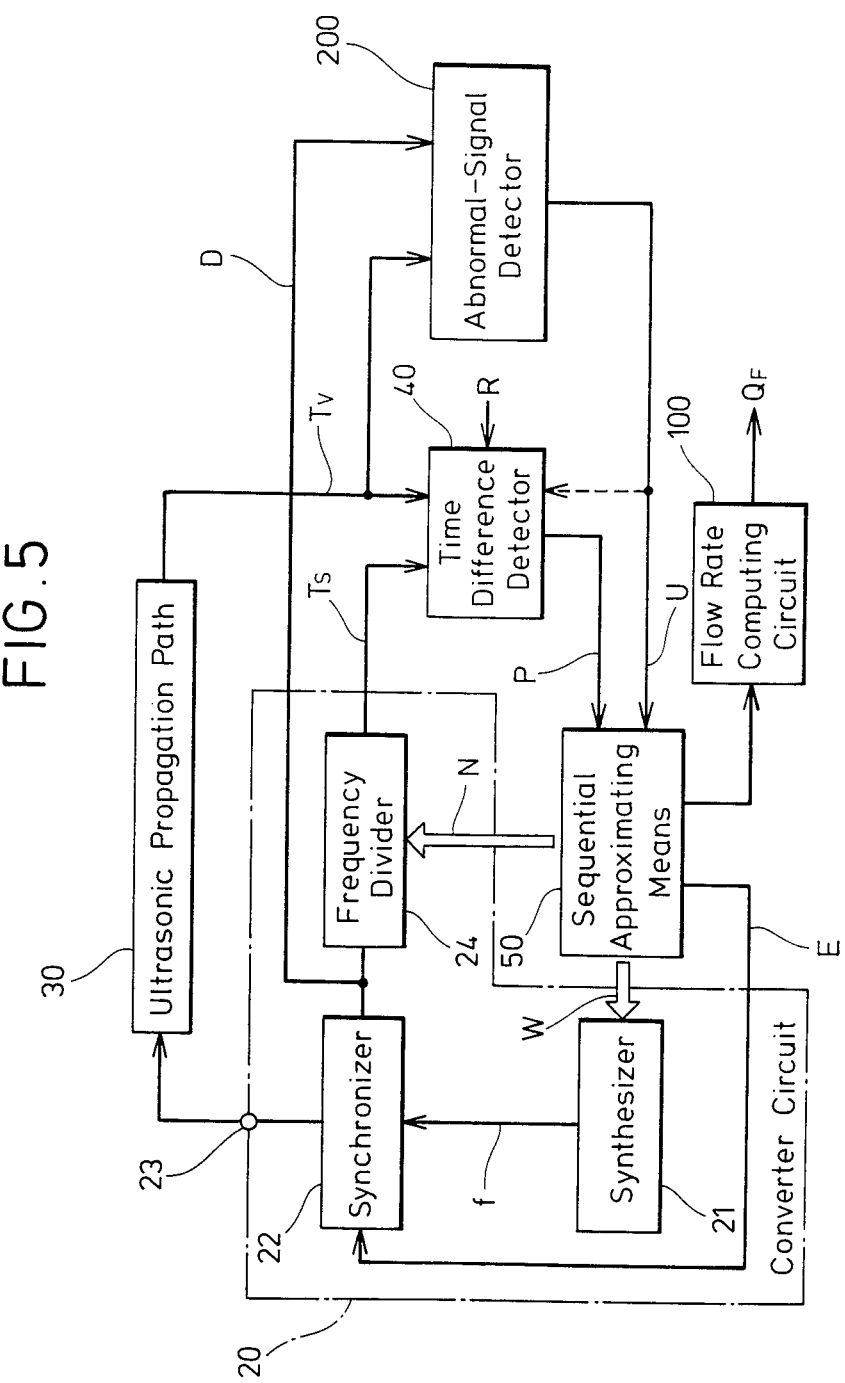
FIG. 5 and FIG. 6 are block diagrams depicting other illustrative embodiments of the invention.
Figure 6:
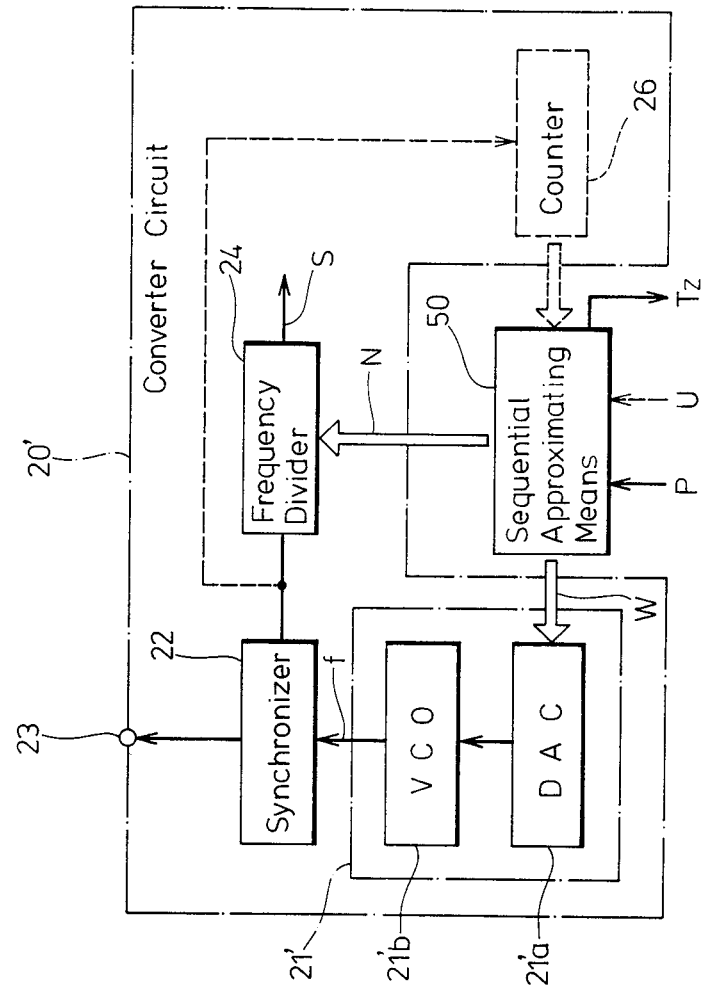

FIGS. 5 and 6 are block diagrams of other illustrative embodiments of the invention. The ultrasonic flowmeter shown in FIG. 5 differs from that of FIG. 2 in that there is included an abnormal signal detector 200 and a start signal E is given by a sequential approximating means 50 to a synchronizer 22. The start signal E may, of course, be given in the same manner as shown in FIG. 2. Abnormal signal detector 200 acts to monitor the time difference between a signal D supplied from synchronizer 22 and a reception time signal $T_V$ supplied from an ultrasonic propagation path 30, to detect when the time difference exceeds a preset time to thereby detect a normal or abnormal reception time signal $T_V$ obtained from ultrasonic propagation path 30, and to supply a discrimination signal U to sequential approximating means 50 (discrimination signal U may be supplied to a time difference dtector 40 as indicated by the dotted line). Abnormal signal detector 200 may be constructed of known circuitry.

With the arrangement of FIG. 5, any abnormally measured value, such as those generated under the influence of dirt, bubbles, or other foreign matters, trapped in the fluid, can be removed.

The flowmeter of FIG. 6 is different from that of FIG. 2 as to the construction of the converter circuit. More speccifically, in FIG. 6, a synthesizer 21', which corresponds to synthesizer 21 in FIG. 2, comprises a digital to analog converter (herein called "DAC") 21'a and a voltage controlled oscillator (herein called "VCO") 21'b. Where $\partial f/\partial w$ does not become constant with such an arrangement, that is, where an output frequency f and a control signal W are nonlinear, a counter 26, shown by the broken line, may be provided for self calibrating output frequency f, or control signal W, or both. The frequency at which counter 26 effects self calibration, need not be high. For example, the measurement time may be interrupted for 100 mS once in every ten seconds, to keep control signal W constant for measuring output frequency f. This does not adversely affect the measurements.

In circuit arrangements according to the invention, depicted in FIGS. 2 through 6, and other embodiments to be discussed, reception time signal $T_V$ is obtained within receiver 37. Reception time signal $T_V$ is generated in receiver 37 by manually establishing a threshold value, in advance, for reception signal V based on certain conditions, such as pipe diameter and fluid being measured, and detecting reception time signal $T_V$ based on reception signal V at the time it exceeds the threshold value. However, this process of manually establishing the threshold value is not the best way from the standpoint of operational efficiency and cannot react quickly with variations in measurement conditions.

To solve the above problem, self learning capability was introduced into the system. A reception signal detector having a self learning capacity was introduced in place of the capacity for producing reception time signal $T_V$ in receiver 37. The illustrative embodiment depicted in FIG. 7 has such a self learning capacity, and is higher in accuracy and reliability as a result. This embodiment differs from the flow meter of FIG. 2 in that it has an ultrasonic propagation path 30' and a reception signal detector 60 connected between path 30' and a time difference detector 40. Path 30' is different from path 30 in FIG. 2, in that it has no capacity for comparing reception signal V and threshold value in the receiver 37, in path 30 as shown in FIG. 2. Accordingly, ultrasonic propagation path 30' generates a reception signal V. Thus, on the reception signal detector 60 will hereafter be described in detail for sake of clarity of description.

Reception signal detector 60 includes a comparator 61 for comparing reception signal V received from ultrasonic propagation path 30' with a trigger level and supplies a reception time signal $T_V$ as a result of the comparison, to time difference detector 40 and also to a counter 62. A count value M obtained by counting reception time signal $T_V$ in counter 62 is supplied to a reference self setting means (hereafter referred to as a "control circuit") 63 having a self-learning capability. Reception signal detector 60 also comprises a digital to analog converter (herein called "DAC")64 through which an output signal from control circuit 63 is led to comparator 61.

Figure 8:
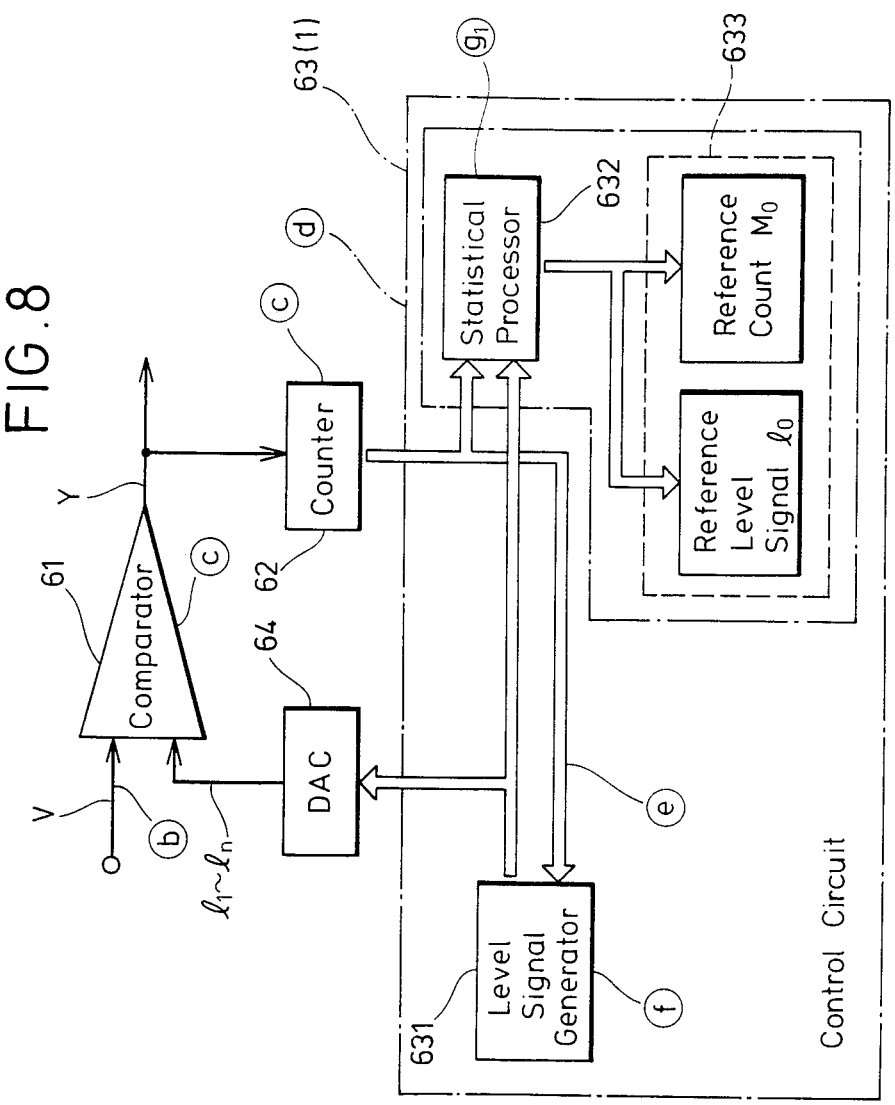
FIG. 8 and FIG. 9 are block diagrams depicting control circuits used in the embodiment of FIG. 7, and illustrating different modes of operation.
Figure 9:
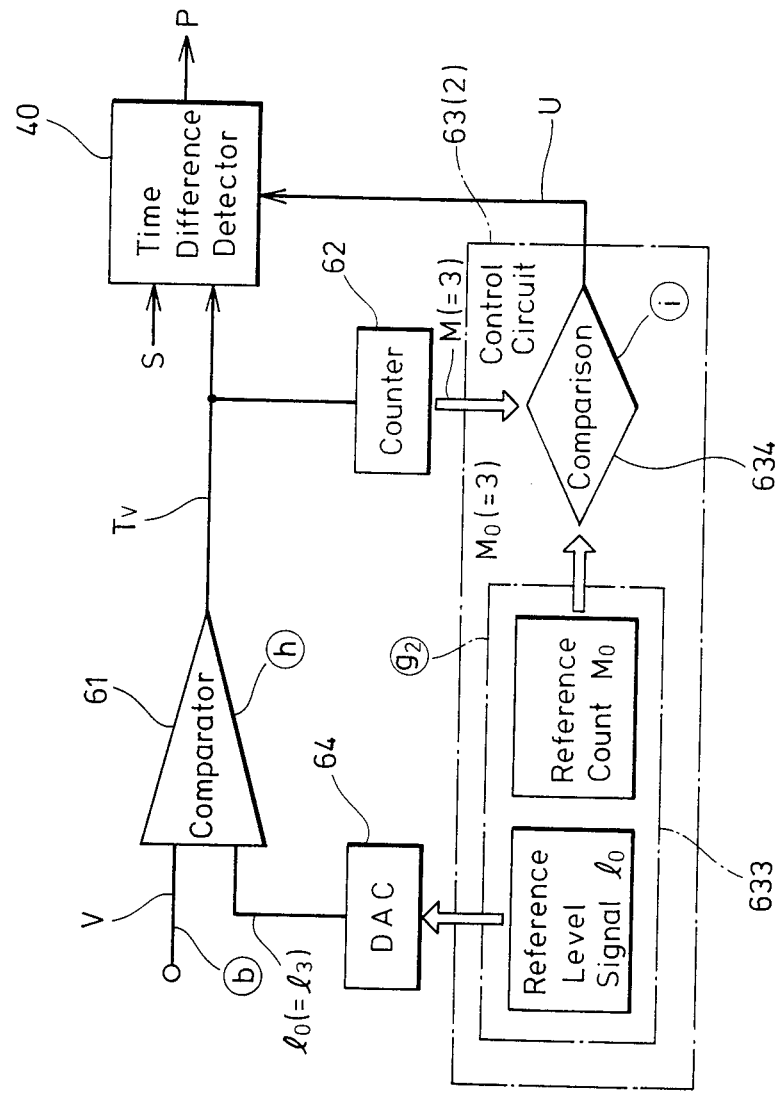

The function of reception signal detector 60 will be described with reference to FIGS. 8,9,10. FIG. 8 shows in block diagram form a first self learning capability of control circuit 63, for self learning and establishing a reference value. FIG. 9 shows in block diagram form a measurement mode for measuring the flow rate of a fluid based on the reference value established by the first self learning capability. FIG. 10 is a flow chart illustrating overall operational routines of the reception signal detector 60.

In the flow chart of FIG. 10, the portion below line D-D is indicative of the operation of control circuit 63. The area defined by the dot and dash line I indicates a first learning capacity. The area defined by the two dot and dash line II indicates a measurement mode. The area defined by the three dot and dash line III includes a second self learning capacity.

The value of the reference trigger level signal l (herein referred to as "reference level signal $l_o$") is determined by a plurality of trigger levels (hereinafter called "predetermined level signals") $l_1-l_n$. The first learning capability measures reception signal V a plurality of times with $l_1$=constant, measures reception signal V a plurality of times $l_2$=constant, and successively measures reception signal V in the same manner for the constant predetermined level signals $l_3, l_4, l_5, \ldots l_n$, statistically processes the measured data to determine the reference level signal $l_o$ and a reference value (herein called "reference count") Mo which should serve as a reference for determining the count counted by the counter 62. Rather than the measurement, with predetermined level signals $l_1, l_2, \ldots l_n$, being kept constant, these predetermined level signals may be succesively varied to obtain the above results. Thus, the invention is not limited to the discussed process of determining the reference level signal and reference count.

The operation is now described with reference to FIGS. 8 and 10. Control circuit shown in FIG. 8 is in a mode of operation for determining reference level signal $l_o$ and reference count Mo, and is denoted by reference numeral 63(1). Control circuit 63(1) has a predetermined level signal generator 631, a statistical processor 632, and a storing means 633 for storing reference level signal $l_o$ and reference count Mo, determined by statistical processing means 632. The control circuit illustrated in FIG. 9 is in a mode of operation for issuing reception time signal $T_V$ based on reference level signal $l_o$ and reference count Mo that have been determined, and is denoted hereat by reference number 63(2). Control circuit 63(2) has storing means 633 for storing reference level signal $l_o$ and reference count Mo and a comparison circuit 634 for comparing reference count Mo, from the storing means 633, with a count M from counter 62.

FIRST SELF LEARNING CAPABILITY.

FIGS. 8 and 10 depict the following routine.

1. The power supply is turned on at step a, and a reception signal V is led from ultrasonic propagation path 30 to comparator 61 at step b.

2. Predetermined level signal $l_1$, of a digital value, is supplied from predetermined level signal generator 631, in control circuit 63(1) to DAC 64, which converts the digital signal into an analog signal that is supplied to comparator 61 at step f.

3. Comparator 61 compares reception signal V and predetermined level signal $l_1$, and a comparison value Y (the symbol "Y" is used to indicate operation of the first learning capability) is led to counter 62. Counter 62 supplies count M to control circuit 63(1) at step c.

4. Control circuit 63(1) confirms whether waveforms have been counted given number of times for predetermined level signals $l_1$. It is now assumed that there are count values $M_1, M_2, \ldots M_n$ (the suffixes 1,2, ... n indicate the number of counting occurrences. $M_1$ is the count obtained by a single counting occurrence. $M_2$ is the count obtained by two counting occurrences. $M_n$ is the count obtained by n counting occurrences. If the prescribed number of measuring occurrences is 20, then control circuit 63(1) confirms that $M_1+M_2+\ldots M_n=20$. The confirming process can be effected, such as by a count array means for counting values corresponding to the respective count values and finishing its operation due to an overflow when the sum of counts has reached a predetermined value (hereat the value being 20). The same process can be performed by a microcomputer. When the predetermined number of measuring occurrences has been reached, the predetermined level signal is changed from $l_1$ to $l_2$, and the measurements are effected again at step d. The values obtained at this time are statistically processed by the statistical processor 632.

5. The control circuit 63(1) confirms that waveforms have been counted a prescribed number of times for all of the predetermined level signals $l_1-l_n$ at step e.

6. Upon completion of the first self learning process, reference level signal $l_o$ and reference count Mo are selected from data which are statistically processed thus far at step g. For example, it is assumed that the maximum counting number $M_2=5$ for the predetermined level signal $l_1$, the maximum counting number $M_2=6$ for the predetermined level signal $l_2$, the maximum counting number $M_3=10$ for the predetermined level signal $l_3$, and the maximum counting number $M_n=5$ for for the predetermined level signal $l_n$, and that the maximum counting number $M_3=10$ for the predetermined level signal $l_3$ is the greatest among others. The self learning capability now selects $l_3$ as the reference level signal $l_o$ and $M_3$ as the reference count Mo, and stores these values as $l_o=l_3$, Mo$=M_3$, in the storing means 633.

MEASUREMENT MODE.

Measurement is started at the selected reference values. FIGS. 9 and 10 depict the following routine.

1. Reference level signal $l_o$ ($=l_3$) stored in storing means 633 is led via DAC64 to comparator 61 and compared with reception signal V in comparator 61 at step h.

2. The results of the comparison in comparator 61 (the result of the comparison of time the measurement is started, in reception time signal $T_V$, as shown in FIG. 2) is supplied to time difference detector 40 and counter 62. Proving count M in counter 62 at this time is 3, since reference count Mo is selected as $M_3=3$, M$=$Mo at step i, therefore, discrimination signal U supplied from control signal circuit 63(2) to time difference detector 40, is of a normal value (for example U=1).

3. If reception signal V is varied and M=2 as a result, then M≠Mo, and a discrimination signal U indicative of an abnormality (for example U=0) is supplied from control circuit 63 to time difference detector for at step j.

4. Time difference detector 40 confirms whether the comparison value or the reception time signal $T_V$ is normal or not. If normal, timing priority is checked between reception time signal $T_V$ and frequency division time signal $T_S$, and the result is led as output signal P to sequential approximating means 1. If not normal, reception time signal $T_V$ (or the result of computation) is rejected.

SECOND SELF LEARNING CAPABILITY.

The second self learning capacity serves to learn again if the reference level signal $l_o$ and the reference count Mo as established by the first self learning capability are proper or not. The second self learning capability comprises a first method of confirming the ratio of normal to abnormal signals at constant time intervals at step k; a second method of confirming the ratio of normal to abnormal signals from the discrimination signal U, at step k; a third method which is a combination of the first and second methods, at step k; a fourth method of forcibly changing reference level signal $l_o$ and reference count Mo, that are currently established, and discriminating the currently set values based on the changed values; and a fifth method which is a combination of the first, second, third and fourth methods, at step l.

Figure 7:
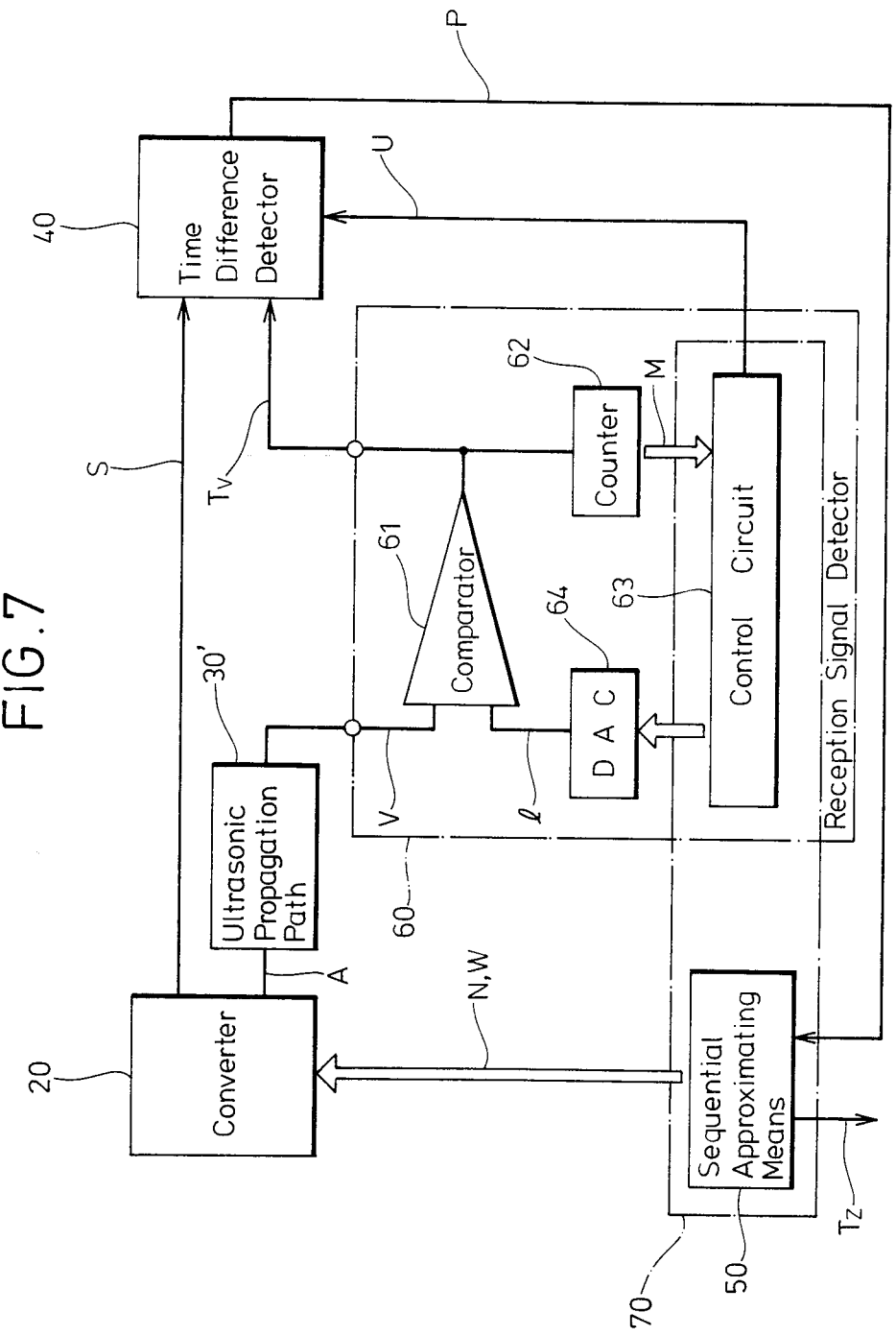
FIG. 7 is a block diagram depicting still another illustrative embodiment of the invention.

Reception signal detector 60 is constructed and operates as described above. While reception signal detector 60 is shown in FIG. 7, as being outside of ultrasonic propagation path 30', the function of reception signal detector 60 may be included in the receiver so that reception time signal $T_V$ can be picked up from output terminal 38 of propagation path 30, of FIG. 2.

Reception signal detector 60 of FIG. 7 may be modified in the following manner. Count M from counter 62 may be kept constant by enabling control circuit 63 in reception signal detector 60 to control the gain of receiver 37 in path 30. Count M may be rendered constant by comparing reception signal V with a reference value preset in a comparator and using the result of the comparison to control circuit 63 through a FF. Discrimination signal U may be supplied to sequential approximating means 50 in the same manner as shown in FIG. 5.

ADVANTAGES OF THE INVENTION.

The invention has many advantages. For example, since the problem of mutual interference, due to two voltage controlled oscillators which have conventionally been used, is eliminated, an ultrasonic propagation time T can be measured with high accuracy. Also, since there is no analog circuit, the inventive flowmeter is free from drifts, and operates with a high degree of reliability.

Moreover, the number of occurrences of correction shown in FIG. 4(B) is in the range of 10 to 20, and, providing the time required for a single corrective action is 1 mS, the total correction time is in the range of 10 to 20 mS. With the ultrasonic propagation time T in a next previous measurement cycle being of an approximate value, the correction time can be shortened, and the ultrasonic flowmeter of the invention is thus advantageously capable of higher speed response.

Furthermore, since the circuit arrangement is simple, advantageously, it can be manufactured at low cost, and be more reliable than conventional flowmeters.

Also, in the invention, the setting of frequency division time for the frequency divider, is controlled by control signal N. Thus, advantageously, the frequency division time can quite easily be changed, and a wide frequency division range can be achieved.

Furthermore, with the reception signal detector 60 having self learning capabilities, the inventive flowmeter can be adjusted to conditions thereof in which it is installed without effort by the operator. Advantageously, the adjustment can be carried out highly accurately and highly reliably. Control circuit 63 and sequential approximating means 1 may be comprised of a single microprocessor, as indicated by the dot and dash line in FIG. 7. This eliminates the need for a substantial increase in the number of components of the flowmeter. This results in a substantial reduction in number of components. Thus, considering the increased accuracy that has been achieved, an advantageous feature which results is a greatly increased performance vs cost ratio. The invention is thus of high industrial usefullness.

The foregoing description is illustrative of the principles of the invention. Numerous modifications and extensions thereof, would be apparent to the worker skilled in the art. All such modifications and extensions are to be considered to be within the spirit and scope of the invention.

What is claimed is:

1. An ultrasonic flowmeter comprising
a pipe for passage therethrough of a fluid to be measured;
an ultrasonic propagation path comprising ultrasonic transducers mounted on said pipe for transmitting and receiving an ultrasonic wave through said fluid flowing through said pipe;
a signal generator for generating a synchronizing signal to drive said ultrasonic transducers;
a flow rate computing unit for computing flow rate of said fluid in response to a reception time signal from said ultrasonic propagation path;
said signal generator comprising a converter circuit responsive to a control signal from said flow rate computing unit, for supplying said synchronizing signal and a frequency division time signal synchronously with said synchronizing signal; and
said flow rate computing unit comprising a time difference detector, supplied with said frequency division time signal from said signal generator and said reception time signal from said ultrasonic propagation path, for detecting a time difference between said supplied signals, and sequential approximating means responsive to an output signal from said time difference detector for supplying said control signal to cause said frequency division time signal to approach said reception time signal in sequential approximation.

2. The flowmeter of claim 1, wherein said control signal supplied to said converter circuit comprises a signal for controlling transmission timing of said synchronizing signal and another signal for controlling said frequency division time signal.

3. The flowmeter of claim 1, wherein a reception signal detector is disposed in said ultrasonic propagation path or between said ultrasonic propagation path and said time difference detector, for delivering said reception time signal therethrough to said time difference detector.

4. The flowmeter of claim 3, wherein said reception signal detector comprises a comparator for comparing said reception time signal and a reference level signal and supplying a detection signal; a counter for generating a count dependent on said detection signal; and reference value self setting means having a self learning capability for setting a reference count to determine whether said count is normal or abnormal and said reference level signal supplied to said comparator to values matching an environment surrounding said fluid and conditions wherein said ultrasonic transducers are installed and for monitoring and correcting said set values, said reference value self setting means generating a signal indicative of a result of determination as to whether said count is normal or abnormal.

* * * * *